(12) United States Patent
Bhattacharya et al.

(10) Patent No.: US 11,989,549 B2
(45) Date of Patent: May 21, 2024

(54) MICRO-PATTERN BASED APPLICATION MODERNIZATION ASSESSMENT

(71) Applicant: International Business Machines Corporation, Armonk, NY (US)

(72) Inventors: Indrajit Bhattacharya, Tarneit (AU); Shweta Jain, Bengaluru (IN); Debasis Roy Choudhuri, Ashburn, VA (US); Venkata Vinay Kumar Parisa, Secunderabad (IN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 17/376,546

(22) Filed: Jul. 15, 2021

(65) Prior Publication Data

US 2023/0015802 A1    Jan. 19, 2023

(51) Int. Cl.
*G06F 8/658* (2018.01)
*G06F 8/36* (2018.01)
*G06F 8/65* (2018.01)

(52) U.S. Cl.
CPC ............... *G06F 8/658* (2018.02); *G06F 8/36* (2013.01); *G06F 8/65* (2013.01)

(58) Field of Classification Search
CPC .............. G06F 8/658; G06F 8/36; G06F 8/65
USPC ........................................................ 717/168
See application file for complete search history.

(56) References Cited

U.S. PATENT DOCUMENTS

| 8,776,007 B2* | 7/2014 | Bijani et al. ............... G06F 8/20 |
| | | 717/106 |
| 2011/0107296 A1* | 5/2011 | Schneider et al. ........ G06F 8/75 |
| | | 717/106 |

(Continued)

FOREIGN PATENT DOCUMENTS

| AU | 2014202907 B2 | 5/2014 |
| WO | 2011041246 A1 | 4/2011 |

OTHER PUBLICATIONS

"Application Modernization: An Essential Guide", IBM Cloud Education, Oct. 16, 2019, 8 pages, <https://www.ibm.com/cloud/learn/application-modernization>.

(Continued)

*Primary Examiner* — Wei Y Zhen
*Assistant Examiner* — Mohammed N Huda
(74) *Attorney, Agent, or Firm* — Brandon Stephens

(57) ABSTRACT

Methods, computer program products, and/or systems are provided that perform the following operations: identifying an application marker for a source application; mapping the application marker to a set of micro-patterns provided in a micro-pattern repository, wherein a micro-pattern defines a set of actions to be performed to modernize a source application component for a target platform; generating a set of potential modernization pathways for the source application, wherein a potential modernization pathway is based, at least in part, on an aggregation of one or more micro-patterns included in the set of micro-patterns mapped to the application marker; determining a recommended modernization pathway from the set of potential modernization pathways based, at least in part, on micro-pattern optimization; and providing the recommended modernization pathway for source application modernization execution, wherein the source application modernization execution includes executing each micro-pattern included in the recommended modernization pathway.

20 Claims, 12 Drawing Sheets

(56) References Cited

U.S. PATENT DOCUMENTS

| | | |
|---|---|---|
| 2014/0143011 A1 | 5/2014 | Mudugu |
| 2014/0278808 A1* | 9/2014 | Iyoob et al. ....... G06Q 30/0206 717/735 |
| 2014/0279201 A1 | 9/2014 | Iyoob |
| 2016/0092813 A1 | 3/2016 | Baker |
| 2017/0012854 A1 | 1/2017 | Balasubramanian |
| 2017/0048316 A1 | 2/2017 | Baker |
| 2017/0270432 A1 | 9/2017 | Sachdev |

OTHER PUBLICATIONS

Jamshidi et al., "Pattern-based Multi-Cloud Architecture Migration", Software—Practice and Experience, Softw. Pract. Exper. 2016, pp. 1-25, Published online in Wiley InterScience (www.interscience.wiley.com), DOI: 10.1002/spe.

Linthicum, David, "How to modernize legacy apps for hybrid cloud", techbeacon, downloaded from the Internet on Feb. 10, 2021, 9 pages, <https://techbeacon.com/enterprise-it/how-modernize-legacy-apps-hybrid-cloud.

Mell et al., "The NIST Definition of Cloud Computing", Recommendations of the National Institute of Standards and Technology, Special Publication 800-145, Sep. 2011, 7 pages.

* cited by examiner

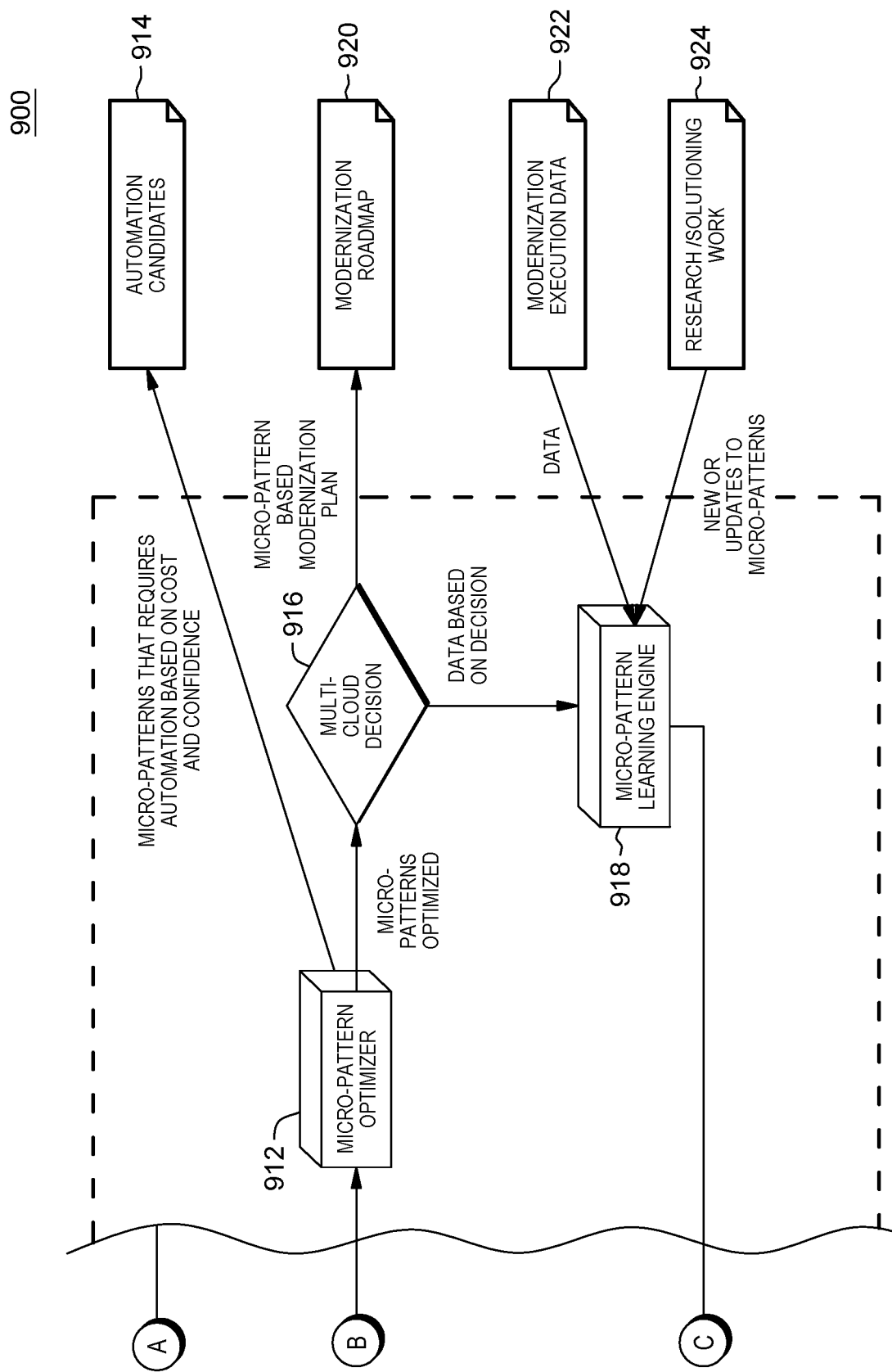

MICRO-PATTERN BASED APPLICATION MODERNIZATION ASSESSMENT

BACKGROUND

The present invention relates generally to the field of application management, and more particularly to providing for the use of micro-patterns in application modernization assessment for application portfolios.

SUMMARY

According to an aspect of the present invention, there is a method, computer program product and/or system that performs the following operations (not necessarily in the following order): identifying an application marker for a source application; mapping the application marker to a set of micro-patterns provided in a micro-pattern repository, wherein a micro-pattern defines a set of actions to be performed to modernize a source application component for a target platform; generating a set of potential modernization pathways for the source application, wherein a potential modernization pathway is based, at least in part, on an aggregation of one or more micro-patterns included in the set of micro-patterns mapped to the application marker; determining a recommended modernization pathway from the set of potential modernization pathways based, at least in part, on micro-pattern optimization; and providing the recommended modernization pathway for source application modernization execution, wherein the source application modernization execution includes executing each micro-pattern included in the recommended modernization pathway.

BRIEF DESCRIPTION OF THE DRAWINGS

FIG. 9A and FIG. 9B depict a block diagram of an example system architecture, according to embodiments of the present invention.

DETAILED DESCRIPTION

Figure 1:
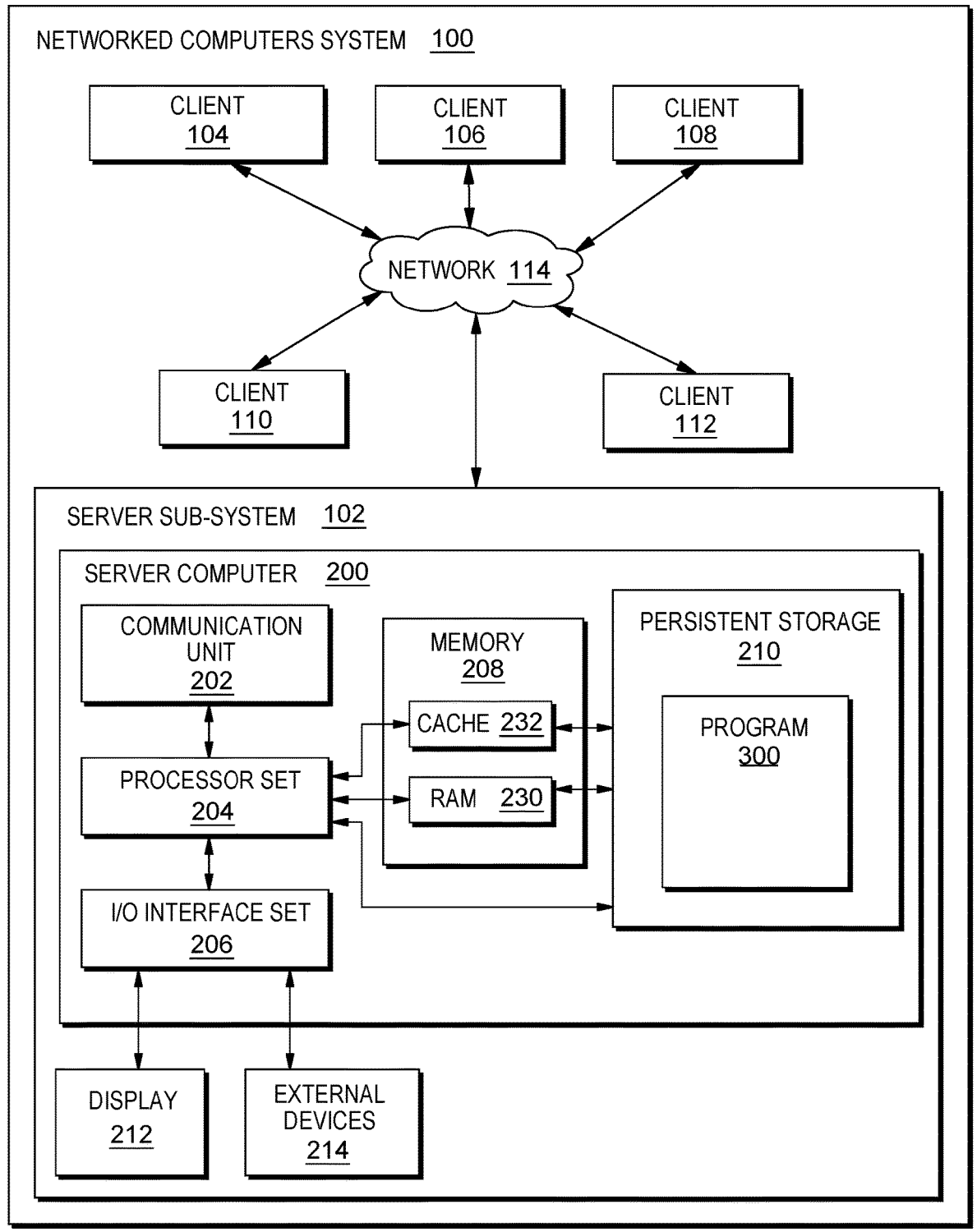
FIG. 1 depicts a block diagram view of a first embodiment of a system, according to the present invention.

According to aspects of the present disclosure, systems and methods can be provided to perform application modernization for application portfolios using micro-patterns. In particular, systems and methods of the present disclosure can provide for using micro-patterns based on application markers to generate potential modernization pathways for an application. The systems and methods of the present disclosure can provide for identifying application markers for an application (e.g., source application, etc.) to be modernized and/or migrated (e.g., to a cloud environment, hybrid cloud environment, etc.). The systems and methods of the present disclosure can provide for identifying one or more sets of micro-patterns (e.g., set of actions to be performed to migrate modernize an application component) from a micro-pattern repository based on the application markers. The systems and methods of the present disclosure can provide for generating one or more potential modernization/migration pathways for the application based on an aggregation of micro-patterns for each component of the application. The systems and methods of the present disclosure can provide for performing micro-pattern optimization to determine a recommended modernization/migration pathway from the one or more potential modernization/migration pathways. The systems and method of the present disclosure can provide for executing each micro-pattern included in the recommended modernization pathway to perform the application modernization. In some embodiments, the systems and methods of the present disclosure can provide for obtaining feedback based on execution of the modernization/migration pathway (e.g., execution of the micro-patterns, etc.) and using the feedback to update a micro-pattern repository, improve micro-pattern selection, optimization, and/or the like.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can create and/or maintain a micro-pattern repository, perform application modernization assessment, identify micro-patterns for application components, generate application modernization pathways, provide micro-pattern execution feedback, update one or more machine-learning models associated with application modernization assessment, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
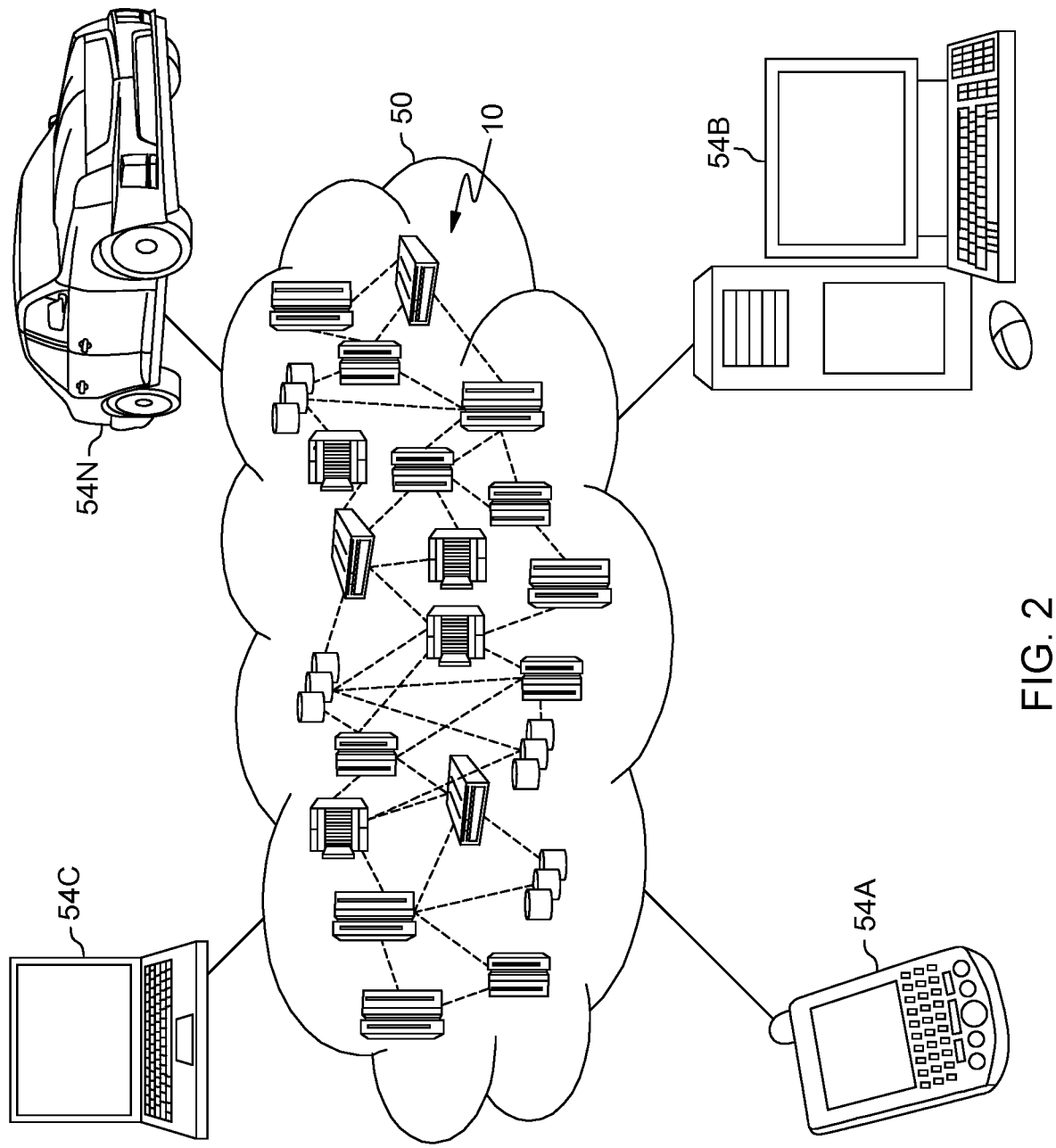
FIG. 2 depicts a cloud computing environment, according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
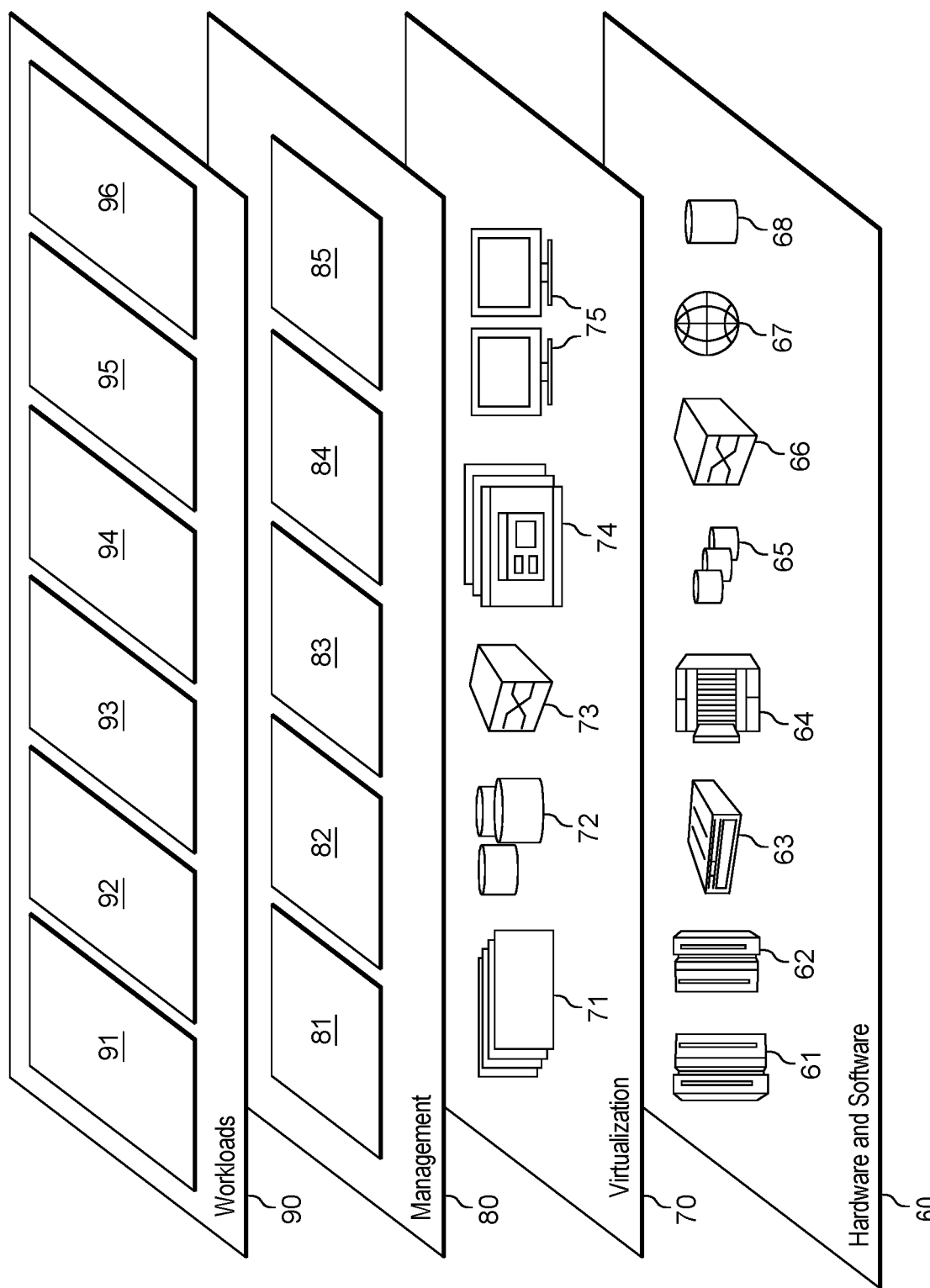
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application modernization assessment 96.

EXAMPLE EMBODIMENTS

Figure 4:
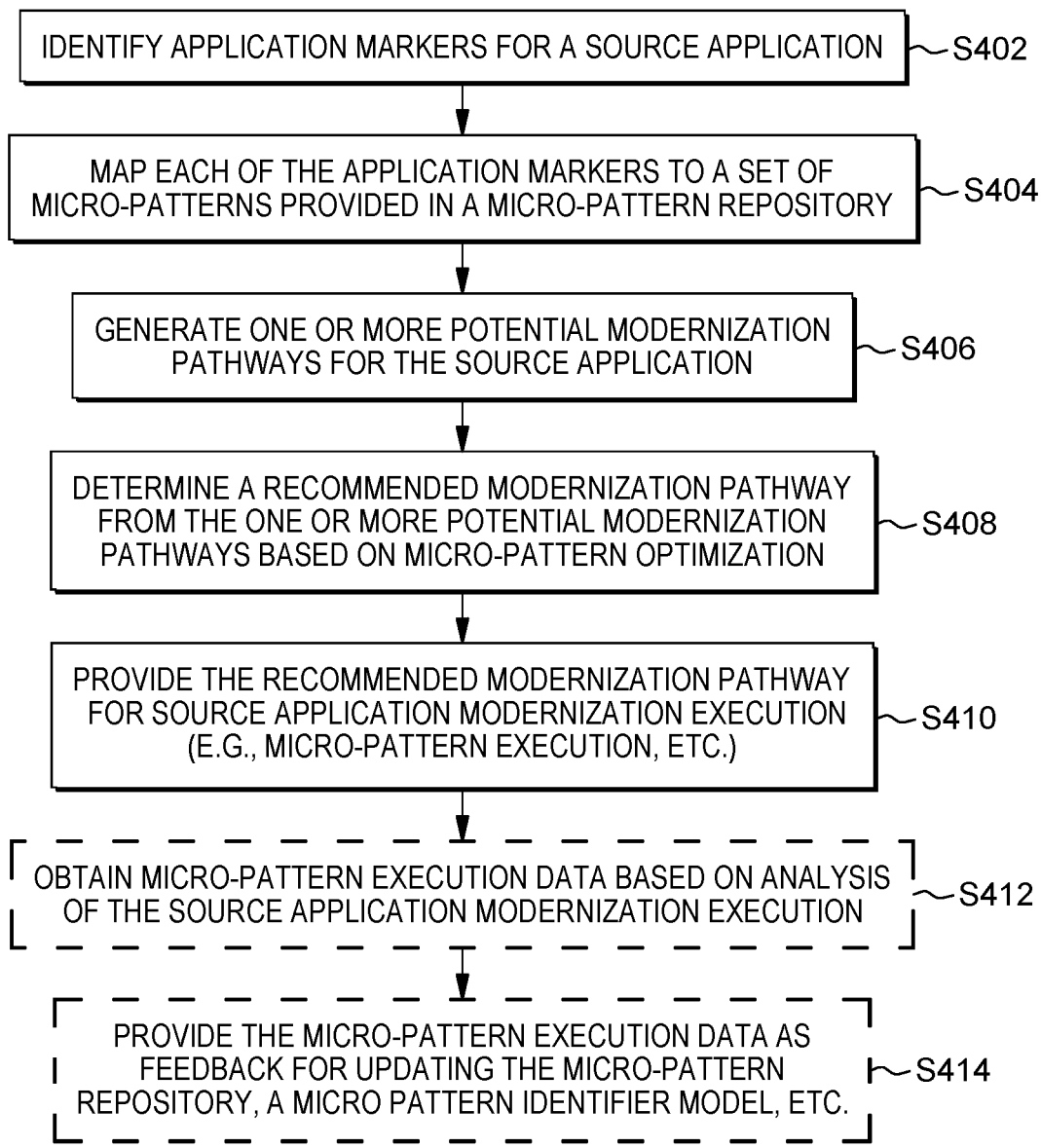
FIG. 4 depicts a flowchart showing a first embodiment method performed, at least in part, by the first embodiment system.
Figure 5:
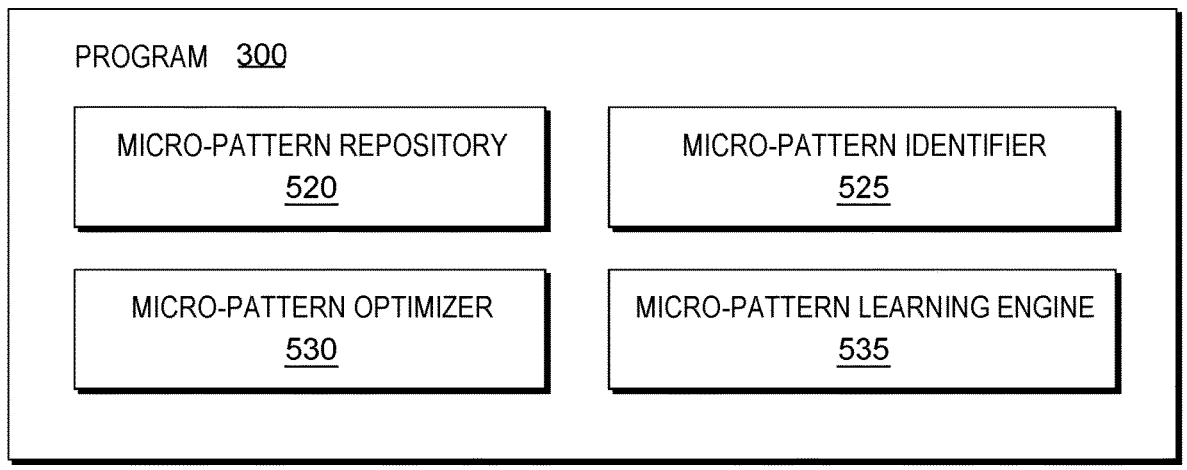
FIG. 5 depicts a block diagram showing an example machine logic (for example, software) portion of the first embodiment system.

FIG. 4 shows flowchart 400 depicting a computer-implemented method, according to embodiment(s) of the present invention. FIG. 5 shows a program 300 for performing at least some of the method operations of flowchart 400. Regarding FIG. 4, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 4 (for the method operation blocks) and FIG. 5 (for the software blocks).

As illustrated in FIG. 4, in some embodiments, operations for application modernization/migration assessment begin at operation S402, where a computing system (e.g., server computer 200 of FIG. 1 or the like) identifies application markers for a source application. In some embodiments, application markers include key characteristics for an application being assessed for modernization/migration. For example, key business characteristics, operational characteristics, technology/software characteristics, infrastructure characteristics, and/or the like can be identified as application markers. In some embodiments, for example, application portfolio data can be provided as input and application markers can be identified for the application(s) in the application portfolio data. Some other examples of application markers include characteristics related to: (i) cache, (ii) authentication/SSO, (iii) security, (iv) data sensitivity, (v) logging, (vi) high availability, (vii) technology, (vii) deployment, (viii) redundancy, and/or (ix) credential encryption.

Processing proceeds to operation S404, where the computing system (e.g., server computer 200 of FIG. 1 or the like) maps each of the application markers to a set of micro-patterns provided in a micro-pattern repository. Each micro-pattern defines a set of actions to be performed to modernize and/or migrate a source application component. Each micro-pattern includes a cost (e.g., effort, etc.) and a confidence (e.g., confidence of success, etc.) for a target platform. As an example, a micro-pattern identifier 525 and/or the like can provide for mapping each of the application markers associated with the source application to a set of micro-patterns obtained from the plurality of micro-patterns included in a micro-pattern repository 520. In some embodiments, the micro-pattern identifier 525 and/or the like can identify one or more micro-patterns, based on the application markers and/or the like, for each component of a source application that is being assessed for modernization/migration (e.g., to one or more cloud platforms, etc.). In some embodiments, a micro-pattern repository can be established based on existing and/or new use cases. The micro pattern repository can associate a cost (e.g., effort), confidence level (e.g., confidence of success, etc.), and benefits for a single target platform with each micro-pattern. Each micro-pattern can be an atomic pattern to modernize/migrate an application component to a specific target platform/environment. In some embodiments, a micro-pattern repository can categorize application markers, for example, based on deployment architecture and/or the like, and associate one or more application markers to a micro-pattern. In some embodiments, a micro pattern identifier may include a machine-learning classification model which provides for mapping application markers to a set of micro-patterns from a micro-pattern repository for one or more environments (e.g., cloud environments, etc.).

Processing proceeds to operation S406, where the computing system (e.g., server computer 200 of FIG. 1 or the like) generates one or more potential modernization pathways for the source application. Each modernization pathway is generated based on an aggregation of one or more micro-patterns that were included in each set of micro-patterns mapped for the application markers. For example, a modernization pathway (e.g., composite pattern, etc.) can include one or more micro-patterns for each component of the source application being assessed for modernization/migration. As an example, a micro-pattern identifier 525 of FIG. 3 and/or the like may generate a plurality of modernization/migration pathways for the application based on aggregating one or more micro-patterns from the sets of micro-patterns identified for the application components.

Processing proceeds to operation S408, where the computing system (e.g., server computer 200 of FIG. 1 or the like) can determine a recommended modernization pathway from the one or more potential modernization pathways based, at least in part on micro-pattern optimization. For example, in some embodiments, the computing system can apply an N-dimensional analysis of the potential pathways and/or micro-patterns to create an optimized list and recommend target options and micro-patterns. In some embodiments, the micro-pattern optimization may be based on relative cost, success confidence level, benefits, and/or the like. As an example, a micro-pattern optimizer 530 and/or the like can perform micro-pattern optimization and determine a recommended modernization pathway from the one or more potential modernization pathways.

Processing proceeds to operation S410, where the computing system (e.g., server computer 200 of FIG. 1 or the like) can provide the recommended modernization pathway for source application modernization execution. The source application modernization execution can include executing each micro-pattern included in the recommended modernization pathway.

Optionally, in some embodiments, processing may continue to operation S412, where the computing system (e.g., server computer 200 of FIG. 1 or the like) may obtain micro-pattern execution data (e.g., source application modernization execution data, etc.) based on analysis of the source application modernization execution. As an example, a micro-pattern learning engine 535 and/or the like may track the selection and/or execution of micro-patterns (e.g., through design and execution phases, etc.).

Optionally, in some embodiments, processing may proceed to operation S414, where the computing system (e.g., server computer 200 of FIG. 1 or the like) may provide the micro-pattern execution data for use in updating/adding to the micro-pattern repository, for updating a machine-learning micro-pattern identifier model, for updating micro-pattern optimization, and/or the like. As an example, a micro-pattern learning engine 535 and/or the like may analyze the execution data and generate feedback to update a micro-pattern repository, improve micro-pattern identifier model(s), improve micro-pattern optimization model(s), and/or the like. In an example, in some embodiments, the computing system (e.g., micro-pattern learning engine 535, etc.) can analyze micro-pattern execution data and determine discrepancies between an actual effort cost based on the micro-pattern execution data and a planned effort cost based on the recommended modernization pathway.

Further Comments and/or Embodiments

Some embodiments of the present invention recognize the following facts, potential problems and/or potential areas for improvement with respect to the current state of the art: (i) existing application modernization tools provide guidance at a high level only, focused on outcome, not the pathway to an outcome; (ii) there are no comparative models to show different options within a cloud platform and/or across cloud platforms; (iii) deriving effort and costs from application modernization assessments is a non-trivial task; (iv) existing solutions do not provide a feedback loop from strategy, to execution, and back to strategy; (v) downstream implementation risk is inherent with current models; and/or (vi) implementation of modernization automation becomes a monolithic problem.

Some embodiments of the present invention address the aforementioned limitations of existing models by: (i) providing clarity to both internal and external stakeholders; (ii) providing a clear view of modernization options across different cloud platforms in a multi-cloud environment; (iii) enabling creation of an implementable solution from the assessment directly without requiring a separate solution stage; and/or (iv) identifying areas of automation and improvement, thereby improving modernization confidence and reducing modernization costs.

Some embodiments of the present invention further differentiate over existing solutions by: (i) providing a fine-grained assessment model based on micro-patterns even with abstract information which helps to provide the cost, effort at a granular level; (ii) providing traceability from strategy to execution via a self-supported machine learning based engine which uses a feedback loop for enhancing future assessments for similar use cases in the future; (iii) providing higher predictability by enabling shift-left decision making for application modernization to increase confidence from strategy to execution, improving transparency and client satisfaction; (iv) providing increased adaptability and resiliency by making modernization assessment adaptable to changing business priorities and technology strategy; (v) minimizing variance that results in a lower impact to downstream cost changes and less variability in the modernization patterns during execution; (vi) providing high confidence estimation by leveraging home-grown automation and tooling developed by service providers to estimate the effort and cost and optimize it over a period of time; (vii) providing an actionable strategy that provides clear recommendations and placement decision based on an artificial intelligence and machine learning based optimization engine for the application(s) being assessed for hybrid multi-cloud; (viii) providing a centralized encyclopedia that builds a common repository of micro-patterns where users/projects/research work continuously contributes to enabling the re-use of patterns across multiple modernization programs; and/or (ix) enabling identification of atomic patterns, resulting in increased efficiency, and reduced risks and costs of modernization initiatives.

Additionally, in some embodiments, engagement specific markers, for example, related to business and/or strategic imperatives, may be obtained for application modernization assessment. Such engagement specific markers (e.g., client-specific constraints, etc.) can be provided for use as weights in assessing modernization pathways to determine optimal recommendations.

In some embodiments, data regarding external factors, such as business constraints, target platform affinity, budget levels, skill levels, and/or the like may be provided. Such external factors may be used to override a recommended modernization pathway (e.g., based on cost, confidence, etc.) and provide for selection of an alternate modernization pathway.

Figure 6:
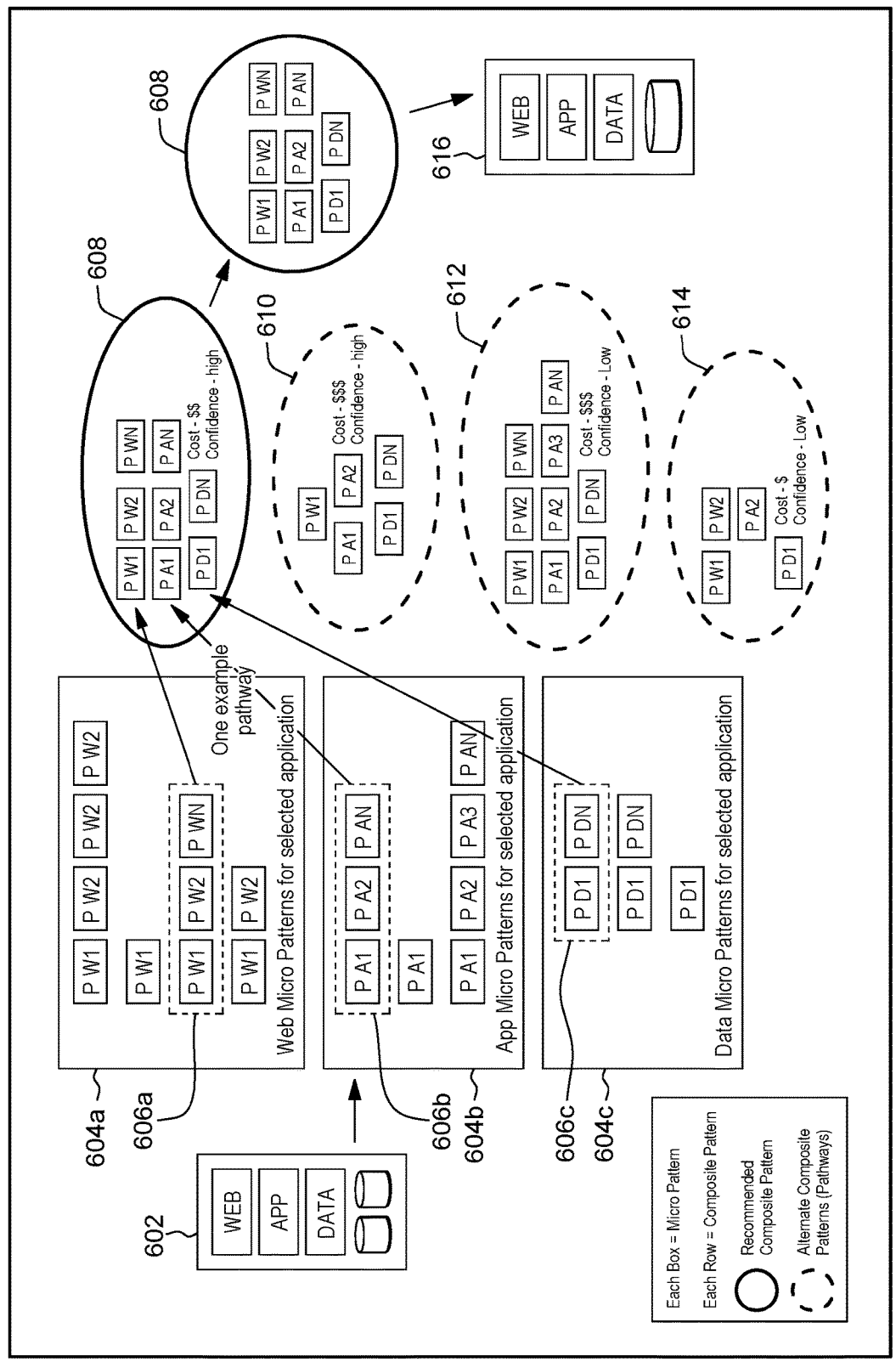
FIG. 6 depicts a block diagram of an example modernization pathway determination, according to embodiments of the present invention.

FIG. 6 depicts a block diagram of an example modernization pathway determination 600, according to embodiments of the present invention. As illustrated in FIG. 6, a source application 602 can be analyzed to identify application markers. Based on the application markers, one or more sets of micro-patterns can be identified for the components of the application 602. Each application component of application 602 can have one or more set of micro-patterns that lead to a modernization outcome (e.g., re-factor). For example, a set of micro-patterns 604a can be identified for one application component, a set of micro-patterns 604b can be identified for another application component, and a set of micro-patterns 604c can be identified for another application component.

A number of potential modernization pathways can be generated based on aggregating micro-patterns from each set of micropatterns for the components of the application, such as potential modernization pathways 608, 610, 612, and 614. As an example, modernization pathway 608 may be generated based on aggregating micro-patterns 606a, 606b, and 606c for the components of the application. In some embodiments, the potential modernization pathways may have one or more target platforms/environments thereby enabling comparison of modernization/migration scenarios across multiple platform/environment options.

Micro-pattern optimization can be performed on the potential pathways and micro-patterns to generate a recommended modernization pathway 608. The recommend modernization pathway can be executed to obtain the modernized application 616.

Figure 7:
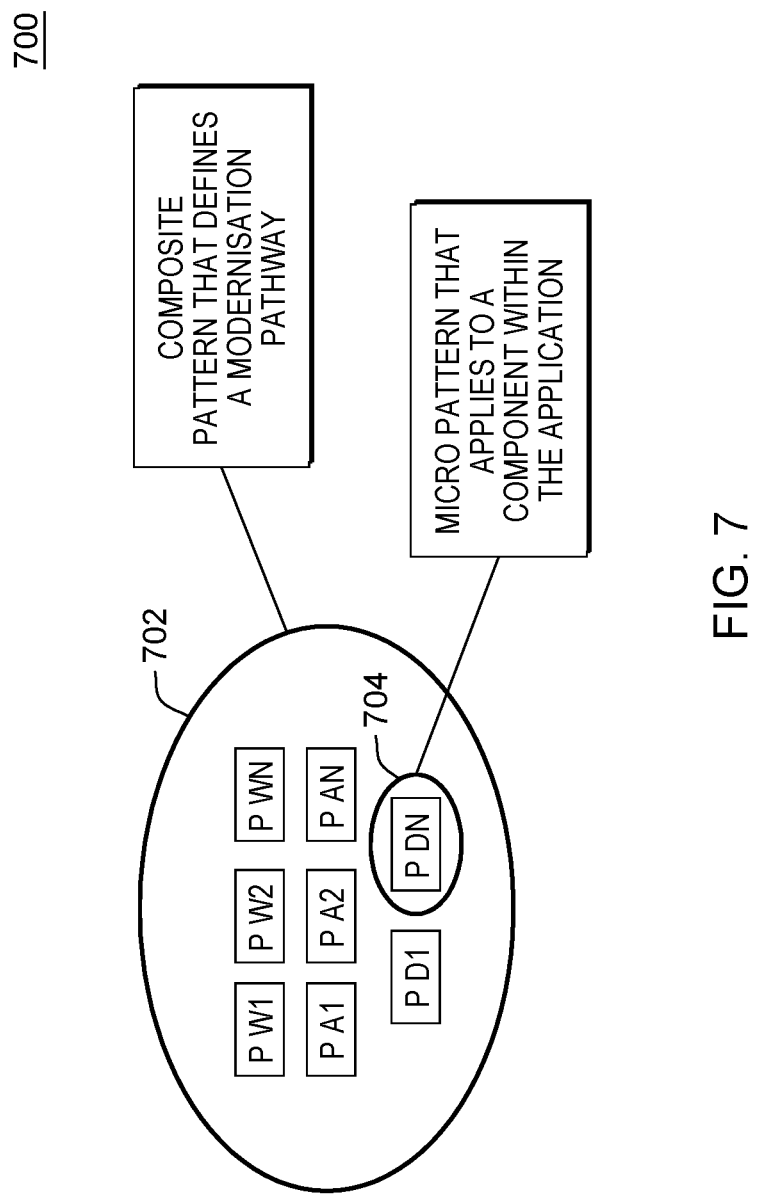
FIG. 7 depicts a block diagram of an example modernization pathway, according to embodiments of the present invention.

FIG. 7 depicts a block diagram of an example modernization pathway option 700, according to embodiments of the present invention. As illustrated in FIG. 7, one or more micro-patterns can be selected from the sets of micro-patterns identified for each component of an application to generate a modernization pathway 702. Each micro-pattern, such as micro-pattern 704 defines an atomic pattern (e.g., series of steps) that applies to a component within the application being assessed for modernization.

Figure 8A:
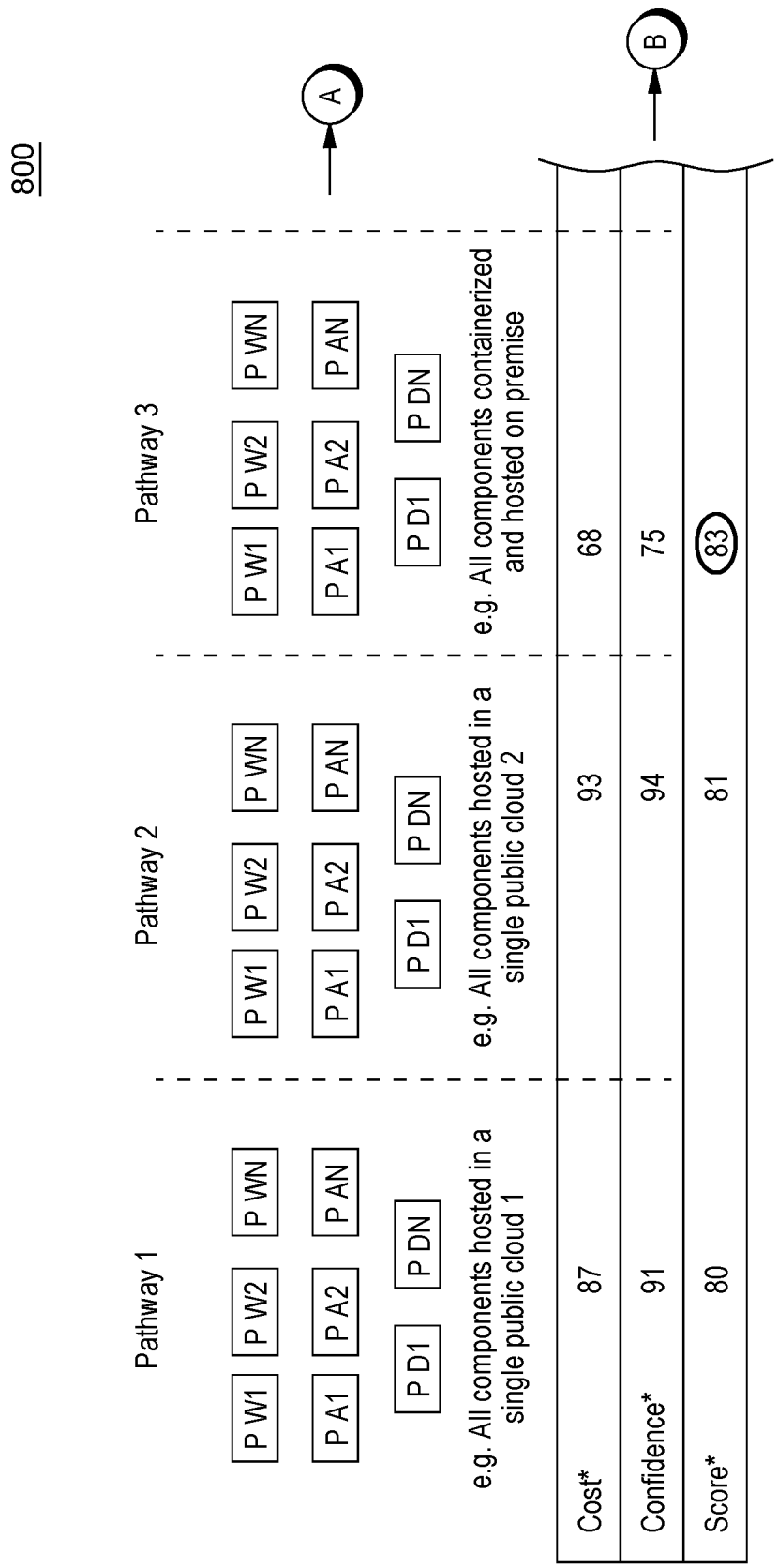
FIG. 8A and FIG. 8B depict a block diagram of an example micro-pattern optimization, according to embodiments of the present invention.
Figure 8B:
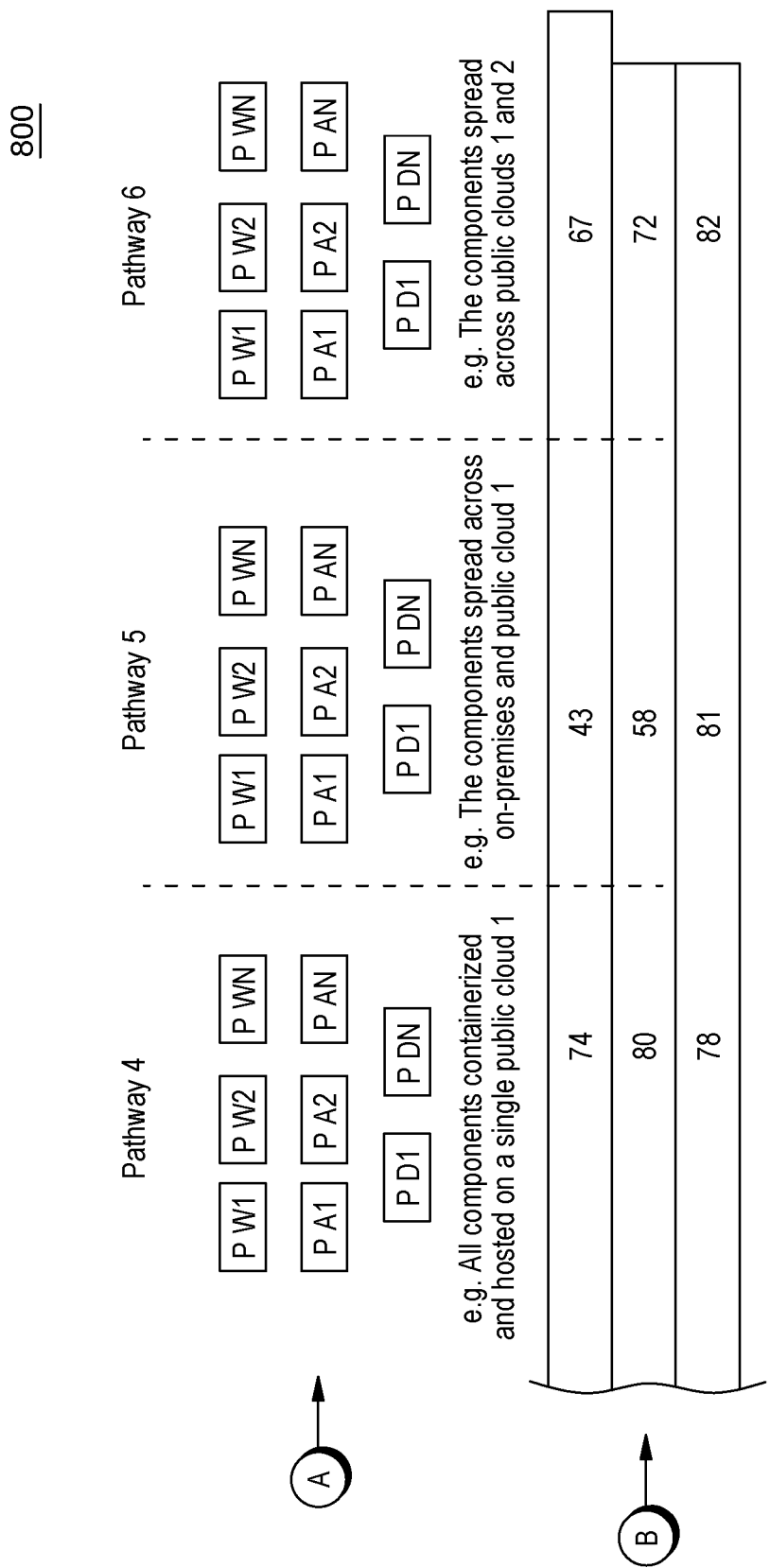

FIG. 8A and FIG. 8B depict a block diagram of an example micro-pattern optimization comparison 800, according to embodiments of the present invention. As illustrated in FIG. 8A and FIG. 8B, for a given application there may be multiple pathways to modernization. Each of these pathways is an aggregation of a set of micro-patterns. Each pathway has a cost and confidence that can be computed from the cost and confidence of each micro-pattern. A scoring model can be used to determine a recommended pathway.

For example, in some embodiments, a micro-pattern optimizer can calculate an effort cost and success confidence level for each of the potential modernization pathways based on the micro-patterns included in the pathway. In some embodiments, the micro-pattern optimizer can create a multitude of decision trees based on selected markers, for example, using a random forest machine learning model and/or the like. In some embodiments, the micro-pattern optimizer can provide a "what if" analysis of effort and/or confidence, for example, using combinations of target platform, target services, and/or the like. In some embodiments, markers such as target platform/environment, target services, operational costs, and/or the like can be used as levers to eliminate potential pathways and identify a recommended modernization pathway.

Figure 9A:
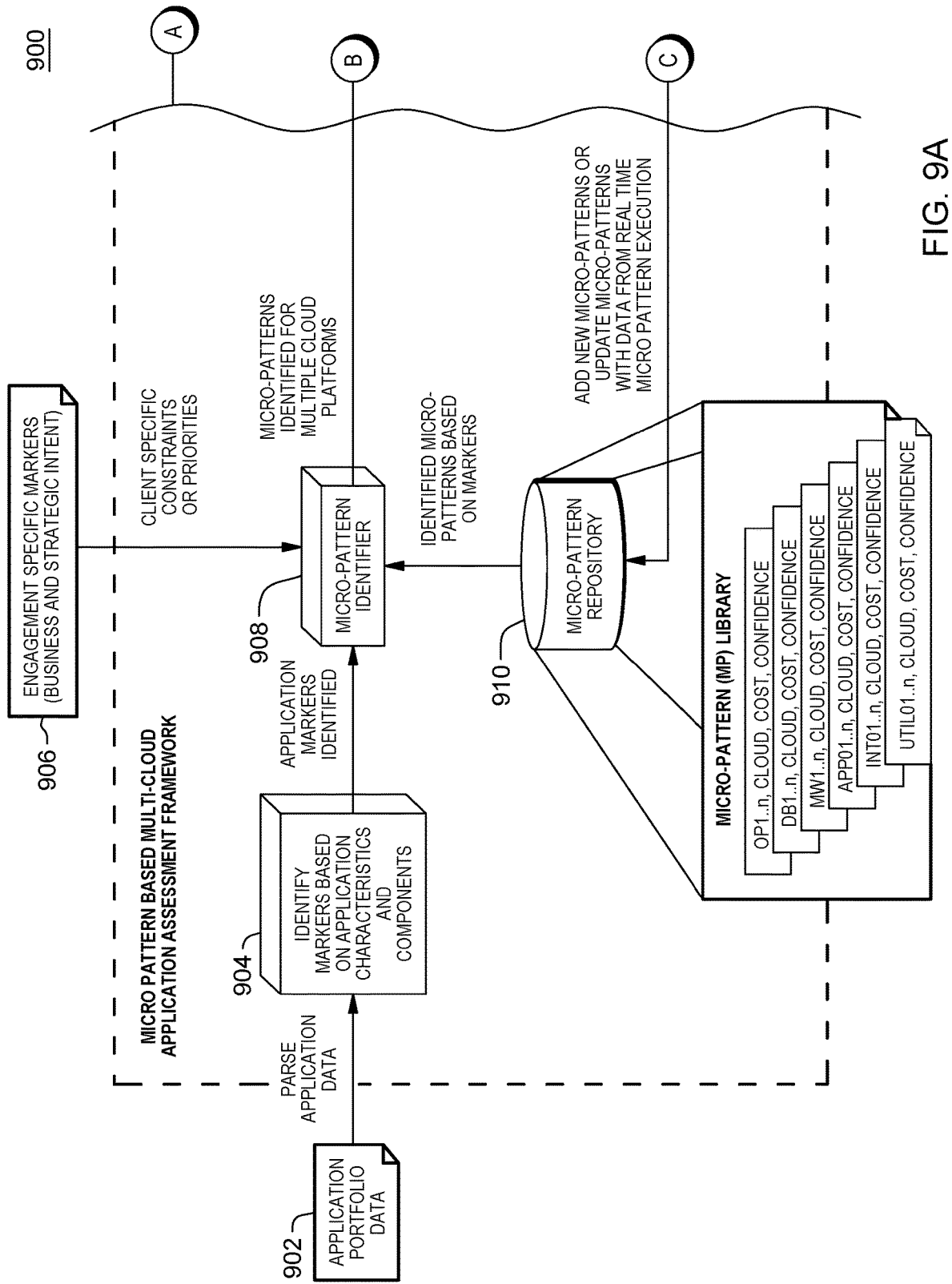

FIG. 9A and FIG. 9B depict a block diagram of an example system architecture 900, according to embodiments of the present invention. As illustrated in FIG. 9A and FIG. 9B, an architecture 900 can include an application assessment framework which includes an application marker identification 904, micro-pattern identifier 908, micro-pattern repository 910, micro-pattern optimizer 912, and multi-cloud decision 916. In some embodiments, the application assessment framework may include a micro-pattern learning engine 918. The architecture 900 can also include application portfolio data 902 provided as input to the application assessment framework and the application marker identification 904. In some embodiments, engagement specific markers 906 can be provided as additional input to the application assessment framework for use in weighted analysis of pathway options, for example.

The application assessment framework can provide output including automation candidates 914, including a plurality of micro-patterns that can be executed for application modernization, and modernization roadmap 920. In some embodiments, the application assessment framework may obtain modernization execution data 922 and/or research/solutioning work 924 which can be provided to the micro-pattern learning engine 918, for example, to update the micro-pattern repository, to improve micro-pattern selection, to improve micro-pattern optimization, and/or the like.

In some embodiments, the micro-pattern repository is a catalog of atomic patterns to migrate/modernize a component to target multi-hybrid cloud(s). In some embodiments, each atomic pattern is associated with a set of markers (e.g., Web/App/DB), a migration strategy, and a deployment pattern, which are key to the selection of a specific atomic pattern for a target cloud and target service. In some embodiments, each atomic pattern is associated with an effort (in hours) and a confidence level. In one example, an application includes several components (e.g., web, middleware, and database), with each component having respective migration strategies (e.g., upgrade/lift & shift, modernize) with respective deployment patterns (e.g., IaaS, PaaS, Serverless/Containers), with each deployment pattern having respective target clouds (e.g., different cloud platforms), and with each target cloud having respective target stacks (e.g., webservers, container environments), where each target stack has a corresponding target pattern.

Figure 10:
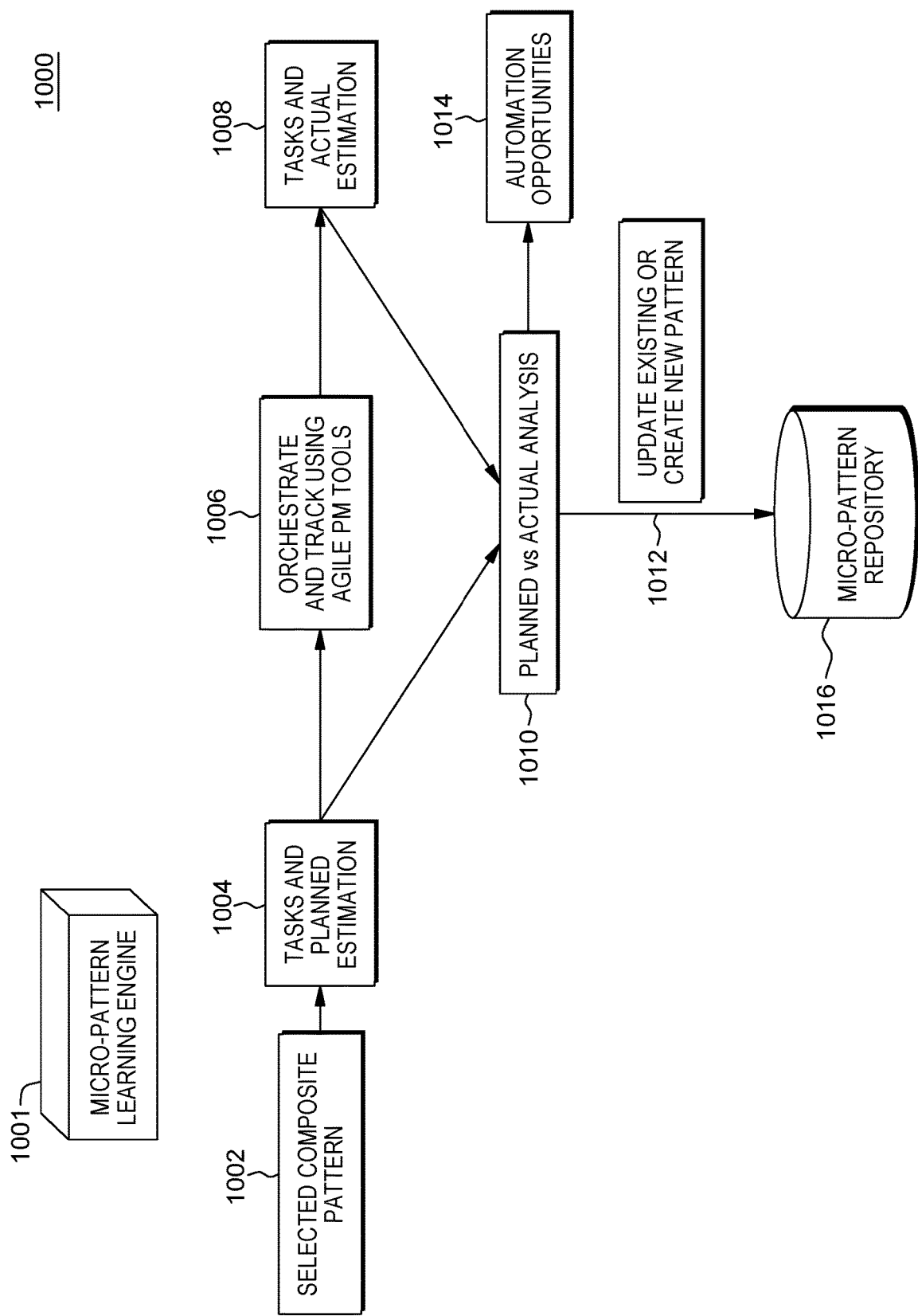
FIG. 10 depicts a block diagram of an example execution feedback loop, according to embodiments of the present invention.

FIG. 10 depicts a block diagram of an example execution feedback loop 1000, according to embodiments of the present invention. In some embodiments, a micro-pattern learning engine 1001 may provide for obtaining modernization execution feedback to use in updating and/or improving application modernization assessment (e.g., repository, selection, optimization, etc.). As illustrated in FIG. 10, a selected modernization pathway 1002, or composite pattern, may be identified. In some embodiments, planned task estimate data 1004 may be determined based on the selected modernization pathway 1002. The selected modernization pathway 1002 may be executed/orchestrated and orchestration 1006 may be tracked (e.g., using agile project management tools). The tracked execution data may be used to generate actual task data 1008. The micro-pattern learning engine may provide for analysis 1010 of the planned task estimate data 1004 versus the actual task data 1008, for example, to identify discrepancies and/or the like, and generate feedback data for application modernization assessment. The micro-pattern learning engine can use the feedback data to update 1012 a micro-pattern repository 1016, micro-pattern identification, micro-pattern optimization, and/or the like. In some embodiments, the micro-pattern learning engine may use feedback from the analysis 1010 to identify automation/efficiency opportunities 1014 associated with application modernization.

In an example embodiment, an application modernization process is performed on a large application suite for a healthcare company. In this embodiment: (i) application component types include System of Engagement (SoE), System of Integration (SoI), and System of Records (SoR); (ii) application development topologies include web, app, integration, and a messaging component; (iii) cloud deployment pathways include private cloud and public cloud; (iv) application performance factors include network latency between server-side component and client-side components located in various medical facilities (hospitals, clinical centers, etc.), and (v) healthcare compliance requirements include HIPPA (Health Insurance Portability and Accountability Act), SOX (Sarbanes—Oxley), PHI (Protected Health Information), and PCI (Payment Card Industry) compliance of the cloud service provider.

Continuing with the example embodiment, the modernization process for the application suite includes containerizing certain workloads, rehosting certain servers, and replatforming certain database resources, all in a hybrid multi-cloud environment, as well as retaining the messaging component in its current location but integrating with the new environment. The containerizing includes an edit code phase, a build container phase, and a test/integrate/deploy phase. The rehosting includes a prepare phase, a capture phase, and a migrate phase. The replatforming includes a prepare phase, a database creation phase, a migrate database phase, and a migrate data phase. The retaining includes a prepare phase and a test/integrate phase.

Continuing still with the example embodiment, three potential modernization pathways are identified for the application suite: a first pathway that utilizes IaaS in a private cloud of the client, a second pathway that utilizes a vendor public cloud and a hybrid cloud orchestration tool, and a third pathway that utilizes PaaS in a vendor public cloud. Each potential modernization pathway includes respective executable micro-patterns for each component of the application, and each potential modernization pathway includes an associated cost, confidence, and value reflecting a level of strategic importance of the tools utilized in the respective pathway. Utilizing an optimization model, the second pathway is selected and provided for execution of its respective micro-patterns.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   identifying application markers for a source application, wherein the application markers include source application components and key characteristics thereof;
   mapping the application markers to sets of micro-patterns provided in a micro-pattern repository, wherein a micro-pattern defines a set of actions to be performed to modernize a source application component for a target platform;
   generating a set of potential modernization pathways for the source application, wherein each potential modernization pathway represents a composite pattern comprised of one or more micro-patterns included in the set of micro-patterns mapped to the application markers, and wherein each micro-pattern includes an effort cost in hours and benefits for at least one specific target platform and a success confidence level of implementation for the at least one specific target platform;
   determining a recommended modernization pathway from the set of potential modernization pathways based on composite pattern optimization, wherein the composite pattern optimization is at least partially based on the effort cost in hours and benefits for the at least one specific target platform and the success confidence level of implementation for the at least one specific target platform of the respective one or more micro-patterns included in the set of micro-patterns mapped to the application markers; and
   providing the recommended modernization pathway for source application modernization execution, wherein the source application modernization execution includes executing each micro-pattern included in the recommended modernization pathway.

2. The computer-implemented method of claim 1, wherein the source application modernization execution is performed across multiple deployment models of a cloud computing environment.

3. The computer-implemented method of claim 1, further comprising:
   obtaining micro-pattern execution data based, at least in part, on analysis of the source application modernization execution.

4. The computer-implemented method of claim 3, further comprising:
   providing the micro-pattern execution data for use in updating the micro-pattern repository.

5. The computer-implemented method of claim 4, further comprising:
   analyzing the micro-pattern execution data;
   determining discrepancies between an actual effort cost based on the micro-pattern execution data and a planned effort cost based on the recommended modernization pathway; and
   updating the micro-pattern repository based on the determined discrepancies.

6. The computer-implemented method of claim 3, further comprising:
   providing the micro-pattern execution data as feedback for updating a machine-learning micro-pattern identifier model.

7. The computer-implemented method of claim 1, wherein:
   each micro-pattern provided in the micro-pattern repository is an atomic pattern configured to modernize an application component to the at least one specific target platform.

8. A computer program product comprising a computer readable storage medium having stored thereon:
   program instructions programmed to identify application markers for a source application, wherein the application markers include source application components and key characteristics thereof;
   program instructions programmed to map the application markers to sets of micro-patterns provided in a micro-pattern repository, wherein a micro-pattern defines a set of actions to be performed to modernize a source application component for a target platform;
   program instructions programmed to generate a set of potential modernization pathways for the source application, wherein each potential modernization pathway represents a composite pattern comprised of one or more micro-patterns included in the set of micro-patterns mapped to the application markers, and wherein each micro-pattern includes an effort cost in hours and benefits for at least one specific target platform and a success confidence level of implementation for the at least one specific target platform;
   program instructions programmed to determine a recommended modernization pathway from the set of potential modernization pathways based on composite pattern optimization, wherein the composite pattern optimization is at least partially based on the effort cost in hours and benefits for the at least one specific target platform and the success confidence level of implementation for the at least one specific target platform of the respective one or more micro-patterns included in the set of micro-patterns mapped to the application markers based; and program instructions programmed to provide the recommended modernization pathway for source application modernization execution, wherein the source application modernization execution includes executing each micro-pattern included in the recommended modernization pathway.

9. The computer program product of claim 8, wherein the source application modernization execution is performed across multiple deployment models of a cloud computing environment.

10. The computer program product of claim 8, the computer readable storage medium having further stored thereon:

program instructions programmed to obtain micro-pattern execution data based, at least in part, on analysis of the source application modernization execution.

11. The computer program product of claim 10, the computer readable storage medium having further stored thereon:

program instructions programmed to provide the micro-pattern execution data for use in updating the micro-pattern repository.

12. The computer program product of claim 11, the computer readable storage medium having further stored thereon:

program instructions programmed to analyze the micro-pattern execution data;

program instructions programmed to determine discrepancies between an actual effort cost based on the micro-pattern execution data and a planned effort cost based on the recommended modernization pathway; and program instructions programmed to update the micro-pattern repository based on the determined discrepancies.

13. The computer program product of claim 10, the computer readable storage medium having further stored thereon:

program instructions programmed to provide the micro-pattern execution data as feedback for updating a machine-learning micro-pattern identifier model.

14. The computer program product of claim 8, wherein:

each micro-pattern provided in the micro-pattern repository is an atomic pattern configured to modernize an application component to the at least specific target platform.

15. A computer system comprising:

a processor set; and a computer readable storage medium;

wherein:

the processor set is structured, located, connected, and programmed to run program instructions stored on the computer readable storage medium; and the stored program instructions include:

program instructions programmed to identify application markers for a source application, wherein the application markers include source application components and key characteristics thereof;

program instructions programmed to map the application markers to sets of micro-patterns provided in a micro-pattern repository, wherein a micro-pattern defines a set of actions to be performed to modernize a source application component for a target platform;

program instructions programmed to generate a set of potential modernization pathways for the source application, wherein each potential modernization pathway represents a composite pattern comprised of one or more micro-patterns included in the set of micro-patterns mapped to the application markers, and wherein each micro-pattern includes an effort cost in hours and benefits for at least one specific target platform and a success confidence level of implementation for the at least one specific target platform;

program instructions programmed to determine a recommended modernization pathway from the set of potential modernization pathways based on composite pattern optimization, wherein the composite pattern optimization is at least partially based on the effort cost in hours and benefits for the at least one specific target platform and the success confidence level of implementation for the at least one specific target platform of the respective one or more micro-patterns included in the set of micro-patterns mapped to the application markers; and program instructions programmed to provide the recommended modernization pathway for source application modernization execution, wherein the source application modernization execution includes executing each micro-pattern included in the recommended modernization pathway.

16. The computer system of claim 15, wherein the source application modernization execution is performed across multiple deployment models of a cloud computing environment.

17. The computer system of claim 15, wherein the stored program instructions further include:

program instructions programmed to obtain micro-pattern execution data based, at least in part, on analysis of the source application modernization execution; and program instructions programmed to provide the micro-pattern execution data for use in updating the micro-pattern repository.

18. The computer system of claim 17, wherein the stored program instructions further include:

program instructions programmed to analyze the micro-pattern execution data;

program instructions programmed to determine discrepancies between an actual effort cost based on the micro-pattern execution data and a planned effort cost based on the recommended modernization pathway; and program instructions programmed to update the micro-pattern repository based on the determined discrepancies.

19. The computer system of claim 15, wherein the stored program instructions further include:

program instructions programmed to obtain micro-pattern execution data based, at least in part, on analysis of the source application modernization execution; and program instructions programmed to provide the micro-pattern execution data as feedback for updating a machine-learning micro-pattern identifier model.

20. The computer system of claim 15, wherein:

each micro-pattern provided in the micro-pattern repository is an atomic pattern configured to modernize an application component to the at least one specific target platform.

* * * * *